Patented May 13, 1941

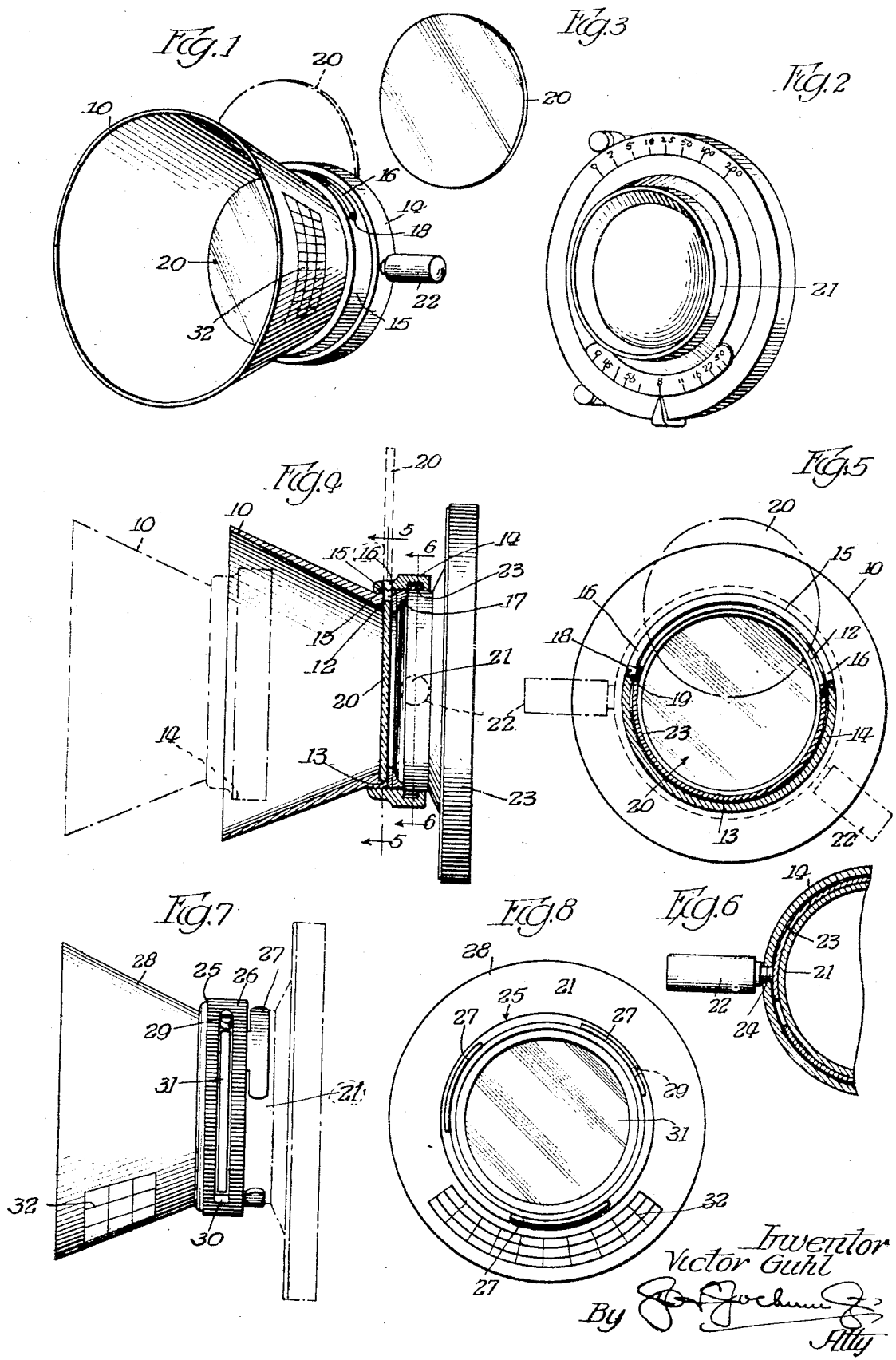

2,241,596

UNITED STATES PATENT OFFICE 2,241,596

SUNSHADE AND FILTER HOLDER FOR CAMERA LENSES

Victor Guhl, Chicago, Ill., assignor to Burke & James, Inc., Chicago, Ill., a corporation of Illinois Application January 27, 1940, Serial No. 315,907

2 Claims. (Cl. 88—1)

This invention relates to improvements in a filter holder and sun shade for use in connection with camera lenses, and one of the objects of the invention is to provide an improved filter holder of this character from which the filter may be readily removed and as readily inserted, whereby filters may be interchanged.

A further object is to provide an improved device of this character which may be readily and detachably applied to a camera lens and which may be secured against accidental displacement when in position with respect to the lens.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a perspective view of a device of this character constructed in accordance with the principles of this invention.

Figure 2 is a detail perspective view of an ordinary camera lens to which this improved sun shade and filter holder may be attached.

Figure 3 is a detail perspective view of a filter.

Figure 4 is a longitudinal section view of Figure 1 showing the attachment applied to a camera lens, and in dotted lines the attachment detached from a camera lens.

Figure 5 is a detail sectional view taken on line 5—5 Figure 4.

Figure 6 is a detail sectional view, on an enlarged scale, taken on line 6—6 Figure 4.

Figure 7 is a side elevation of another form of the invention.

Figure 8 is a rear end elevation of the form of the invention shown in Figure 7.

Referring more particularly to the drawing, the numeral 10 designates a sun shade which is preferably of a frustroconical configuration, the inner surface of which may be lined or coated with any suitable material.

Encompassing the rear open end of the sun shade are peripheral screw threads 11 and the shade is provided with a slot 12 which opens through the periphery thereof to form an open seat 13.

The numeral 14 designates generally a collar which is provided with a portion 15 having internal screw threads adapted to be threaded onto the threaded extremity of the sun shade 10.

This collar is provided with a circumferential slot 16 which extends only partially around the collar and opens through the periphery thereof. The collar 14 may be provided with an annular shoulder 17, if desired, so that when the collar is threaded onto the end of the sun shade the extremity of the latter will abut the collar 17 and thereby control the extent to which the collar may be threaded onto the shade.

These parts may be held together for relative rotation in any desired or suitable manner preferably by means of a screw or fastening device 18 that passes through an opening 19 in one end of the portion 15 that serves as a seat for the lens and this screw or fastening device operates in the slot 16 and limits the extent of rotation of the collar 14 with respect to the shade 10.

When these slots 12 and 16 are brought into register a filter 20 may be inserted into the collar as shown in dotted lines in Figure 1 and after the filter has been positioned, the collar and the shade may be rotated one with respect to the other to move the slot out of alinement or register, thereby maintaining the filter against displacement.

The slots may be arranged in any position, that is, so that the filter may be inserted from the top side or bottom but it is preferable to have the insertion slot at the top of the device so as to insure that the filter will not drop out and break, in the event that the slots should be brought into register which would happen if the slots were on the bottom when they are in register and the operator neglected to place his hand under the slot to catch the filter.

In the forms of the invention shown in Figures 1 to 6, the collar 14 is adapted to be telescoped over the frame 21 of the lens of an ordinary camera, and may be rotated by means of a handle 22 that is secured to the collar and located in a convenient position for the operator.

Housed within the collar 14 is a spring 23 preferably of a substantially C shaped configuration one end thereof terminating or being disposed in proximity to the handle 22.

The handle 22 preferably consists of a reduced portion 24 having threads thereon and this portion is threaded through a portion of the collar 14 so as to contact the end of the spring 23. By adjusting the handle 22 inwardly the spring 23 will be compressed or contracted so as to grip the flange or portion 21 of the lens of the camera, thereby holding the collar 14 against relative movement with respect to the flange 21.

In order to rotate the collar on the flange 21, the handle 22 is screwed outwardly so as to relieve the stress upon the spring 23 and then by means of the handle 22 the collar 14 may be rotated so as to bring the slot 15 thereof into register with the slot 12 in the shade 10.

Likewise the collar may be rotated in the opposite direction to move the slots out of register.

In the form of the invention shown in Figures 7 and 8 the collar 25 which corresponds with the collar 14 in the other form of the invention, is preferably provided with a knurled periphery 26 so as to form a gripping surface for manipulating the collar. Connected to the collar in this form of the invention are laterally projecting springs 27 of any desired length, preferably leaf springs, any number of which may be provided, and these springs co-operate to grip the flange 21 of the camera lens to hold the collar and the shade 28 in position. The pin or screw 29 in this form of the invention also operates in the slot 30 and when this slot 30 is brought into register with the slot in the shade 28, the filter 31 may be inserted thereinto. As in the other form of the invention, when the collar 26 and the shade 28 are relatively rotated one with respect to the other, these slots will be moved out of registering alignment.

In the form of the invention shown in Figures 1 to 5 as well as in Figure 6, the respective pins or screws 18 and 29 not only serve the function of providing a limited extent of relative rotation of the collar and shade, but as the collar and shade telescope and are connected together by one being threaded upon or into the other, the pins 18 and 29 will respectively prevent the collar and the shade from being separated through the medium of the screw threads.

If desired, a suitable indication or chart 32 may be provided on the periphery of the sun shade as a means for instructing the operator in the use of the device.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. As a unitary structure, a ray filter holder embodying a casing comprising concentrically arranged tubular members one of which is adapted to fit over a lens housing, each of said members having a slot through its wall, said members being rotatable one with respect to the other to move the slots into and out of register, a portion of the wall of the innermost member opposite its slot constituting a seat for a filter element, the said filter element being adapted to be inserted into the said seat through the slots when the latter are in registering relation and to be maintained against removal and upon said seat when the said members are relatively rotated to cause an unslotted portion of one to form a closure for the slot of the other member, and means for removably securing one of said members to the lens housing of a camera.

2. As a unitary structure, a ray filter holder comprising a frustroconical tubular body provided with a circumferential slot of substantial length through a portion of its wall adjacent to but spaced from the extremity of the smaller end thereof, an annular member encompassing and rotatably mounted upon the slotted end of said body and projecting beyond the extremity of said end, and itself provided with an extended circumferential slot through its wall adapted to be brought into register with the slot in the said body to form an entrance opening for a filter element, and out of registering relation therewith, by a rotative movement of said body and member one with relation to the other, the said projecting portion of said annular member adapted to telescope over a lens housing, and means for removably securing the said annular member to the lens housing.

VICTOR GUHL.